Feb. 13, 1968  MASAYUKI TAKAMORI  3,368,357

STRUCTURE FOR BREAKING WAVES

Filed Nov. 3, 1965

United States Patent Office 3,368,357
Patented Feb. 13, 1968

3,368,357
STRUCTURE FOR BREAKING WAVES
Masayuki Takamori, 5 281 Hiraoka-cho, Sakai-shi,
Osaka-fu, Japan
Filed Nov. 3, 1965, Ser. No. 506,224
Claims priority, application Japan, Nov. 17, 1964,
39/64,684; Dec. 2, 1964, 39/68,055
4 Claims. (Cl. 61—37)

ABSTRACT OF THE DISCLOSURE

A breakwater structure in which a plurality of blocks are arranged in zig-zag form on a slope and wherein each block rests on two parallel columnar members and abuts columnar members of adjacent blocks such that third columnar members of the blocks extend above the slope in spaced parallel relation.

This invention relates to a structure for counteracting the force of waves to calm them thereby to protect, among other, the sea line and harbors against strong wave forces and to prevent dikes, jetties, or breakwaters from being wrecked by the wave forces.

Various blocks have conventionally been employed to provide protection against waves at waterfront, harbors and reclaimed levees. These blocks are generally used to cover the front of the dikes and the sides of the embankments with the blocks being either piled up in layers or laid at random. The advantages expected of these arrangements are that the wave force is reduced because of the high unevenness of the covering layers, that is, the spaces between the blocks help to reduce the pressure, and reflection of the waves and to thereby decrease the wave energy, while the blocks are stabilized due to mutual engagement or pertinent combinations thereof. It is also desirable to lighten the weight compared with the ripraps or concrete masses. However, the method using these blocks includes such disadvantages that there are provided few spaces because of mutual engagement or combination between blocks, which does not allow easy penetration of the waves, and that in case of occurrence of a non-uniform subsidence of the ground under the embankment, the blocks can not conform thereto, with the result that the mound under the blocks is washed and excavated by water and finally crumbles. These conventional methods are summarized by the sole object of obtaining the wave pressure reducing effect by resistance provided by the surface projections. An increase of surface unevenness to facilitate the wave breaking action results in providing a large impact force when the waves are crashed against the blocks and produce large jumping waves. Those blocks which are light in weight can not stand the impact force of the waves and are moved, dispersed and finally obliterated. On the other hand, if the surface unevenness is lessened, the resulting resistance is reduced, consequently allowing the waves to easily soar and overflow the embankment. Thus the desired object of reducing the wave pressure cannot be attained.

The present invention is designed to eliminate these defects inherent in the conventional wave breaking methods.

This invention concerns a structure comprising a plurality of simple blocks arranged regularly, whereby the object is attained assuredly, effectively as well as economically.

The structure of the present invention can be formed easily by using unit blocks in various shapes.

It is the object of the present invention to reduce the wave force by virtue of the unevenness of the structure, to allow easy refraction and absorption of the dynamic water into the inside of the structure and to diffract and disperse the same while intermixing the air in the inside space thereby to cause the waves to interfere with each other. Thus the jumping and soaring of the waves are repressed and the waves die away quietly.

Further, the present invention is highly stable against the lifting force and the levelling force of the dynamic waters.

In accordance with the invention there is provided a structure which is constituted by a plurality of blocks arranged in zig-zag formation on a slope of an embankment to be rivetted Each block comprises three parallel members and three coupling members connecting the parallel members. The blocks each rest on two parallel members which are in contact along flat side surfaces thereof with the corresponding members of adjacent blocks such that the third parallel members of the blocks are aligned in parallel spaced relation above the slope.

The above said and other objects of the present invention will become more apparent upon reading the following description drawn to several embodiments of the invention and described with reference to the annexed drawings, in which.

Figure 1:
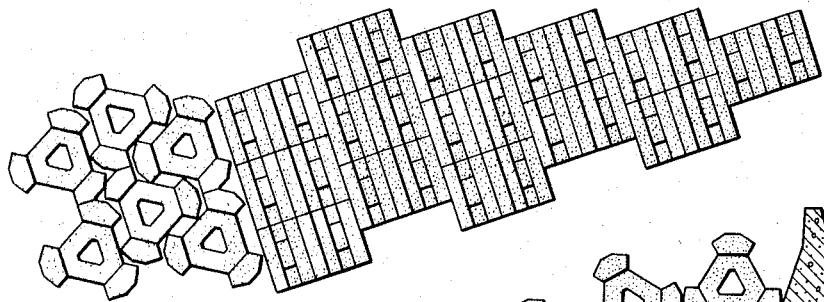
FIGURE 1 is a plan view of the structure according to the invention.
Figure 2:
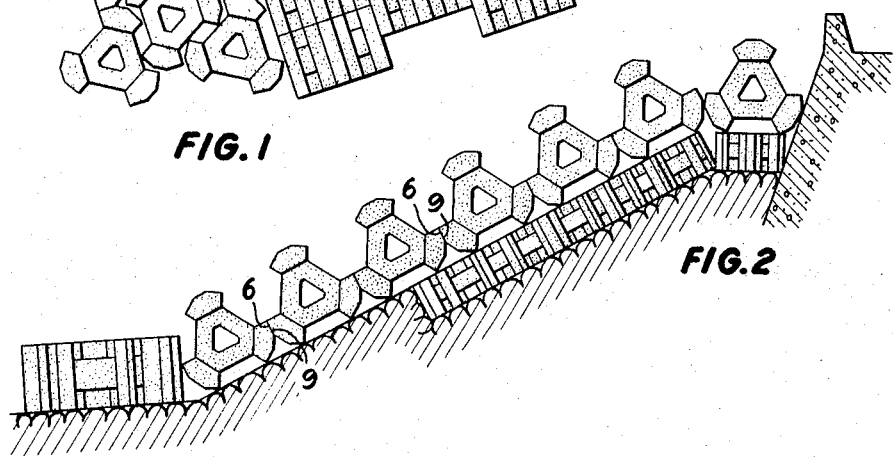
FIGURE 2 is a side elevational view of the structure shown in FIGURE 1.
Figures 3, 4, 5:
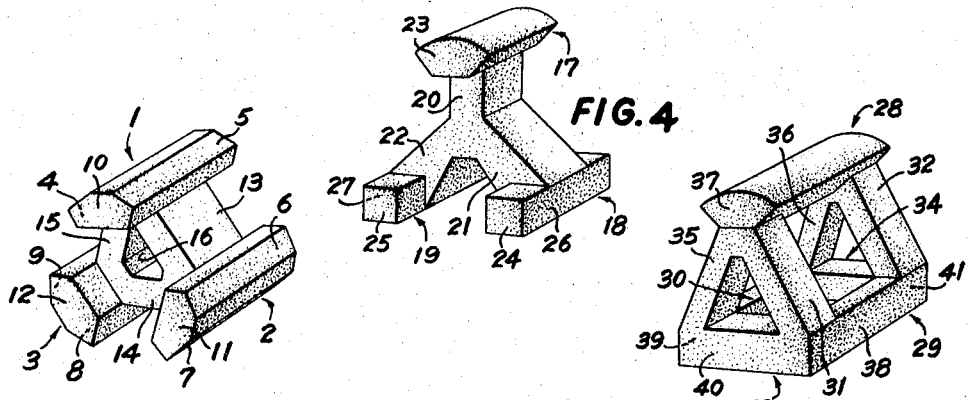
FIGURE 3 is a perspective view of a unit block of the structure of FIGURE 1.
FIGURE 4 is a perspective view of a second embodiment of unit block.
FIGURE 5 is a perspective view of a third embodiment of unit block.

One of the unit blocks of Example 1 which form the structure therein is shown in FIGURE 3. This unit block has three parallel members or columnar bodies 1, 2 and 3 which are axially supported at each apex of a triangular center body. Each of said columnar bodies 1, 2 and 3 is a hexagonal column having a flat section and each has two flat side surfaces 4, 5, 6, 7; and 8, 9, respectively, so that the adjacent blocks are contacted closely at these surfaces with each other when the blocks are arranged to form the structure as shown in FIGURES 1 and 2. The end faces 10, 11, and 12 of the columnar bodies 1, 2 and 3 respectively are plane surfaces perpendicular to the axes thereof. The center body of the unit block comprises three coupling members 13, 14 and 15 each connected to two of said columnar bodies 1, 2 and 3. Namely, the coupling member 13 is connected to columnar bodies 1 and 2, member 14 is connected to columnar bodies 2 and 3 and member 15 couples the columnar bodies 3 and 1. Thus the coupling members 13, 14 and 15 combined together form a triangular column. There is formed a triangular cavity 16 along the center axis of the triangular column formed by said members 13, 14 and 15. The axial length of each of the coupling members 13, 14 and 15 is shorter than that of the columnar bodies 1, 2 and 3. This permits the space between two (e.g. 1 and 2) of the columnar bodies 1, 2 and 3 to communicate with the space between another two bodies (e.g. 1 and 3).

A second embodiment of the unit block is shown in FIGURE 4. This block comprises three parallel columnar bodies 17, 18 and 19 each being fixed to each apex of a three star body so that said apex serves as the axis of each of said columnar bodies. The columnar bodies 17, 18 and 19 are connected to coupling members 20, 21 and 22 respectively. These coupling members are assembled in the center of the block to form the three star body. The columnar body 17 is a column having a roughly sector-shaped section, while the other two 18 and 19 are both quadrangular columns. The opposite ends 23, 24, and 25 of the columnar bodies 17, 18 and 19 respectively are plane surfaces extending perpendicular to the axes thereof. The columnar bodies 18 and 19 are provided with plane surfaces 26 and 27 respectively which permit close binding between the adjoining blocks at said faces when the unit blocks are arranged. It is also so designed that the axial length of each of the coupling members 20, 21 and 22 is shorter than that of the columnar bodies 17, 18 and 19 so as to permit interconnection between the space formed between two of the columnar bodies 17, 18 and 19 and the space formed between the other two thereof.

A third embodiment of the unit block is shown in FIGURE 5. This block has three columnar bodies 28, 29 and 30 extending parallel to one another with their axes at each apex of a triangular center body. The columnar body 28 has a sector-shaped section, while bodies 29 and 30 are quadrangular columns. There are provided three pairs of coupling members 31, 32; 33, 34; and 35, 36 whereby each adjoining two of the columnar bodies 28, 29 and 30 are coupled in succession at both ends thereof. This results in the formation of quadrangular spaces each between the coupling members 31 and 32, between 33 and 34 and between 35 and 36, whereas a triangular space is formed by the coupling members 31, 33 and 35, and by the coupling members 32, 34 and 36. The opposing ends 37 of the columnar body 28 have plane faces extending perpendicular to the axis thereof. On the exterior sides of the columnar bodies 29 and 30 and of the coupling members 33 and 34 are formed plane faces 38, 39 and 40, 41 respectively so that the adjoining blocks are well joined to each other when these unit blocks are arranged to form the structure.

The unit blocks shown in FIGURE 3 are arranged in zig-zag form as illustrated in FIGURES 1 and 2 thereby to obtain the intended structure. One columnar body 1 is positioned with a certain interval from the sloping surface to be revetted, that is, it stays in the space, while two other columnar bodies 2 and 3 are laid on the slope to be revetted. The lying columnar bodies 2 and 3 are closely coupled at their respective plane faces 6 and 9 to the corresponding faces of the adjoining columnar bodies positioned in the direction perpendicular to the axes of the former columnar bodies 2 and 3 and are also closely coupled at their respective planes 10, 11 and 12 to the corresponding planes of the adjoining columnar bodies placed in the axial direction of the columnar bodies 2 and 3. This arrangement brings each block to a stabilized state.

It will be appreciated that the unit blocks shown in FIGURE 4 and FIGURE 5 respectively may also be arranged in the same manner as illustrated in FIGURES 1 and 2 to form the desired structure.

The structure of the present invention as described above is featured by the following characteristics. When the waves roll on the structure, the waves are split into step-like formations by the parallel members or the columnar bodies and then introduced into the spaces between the columnar bodies. The introduced dynamic water is subsequently deflected by the coupling members and then introduced into the spaces between the coupling members. The streams of introduced dynamic water are thereby forced to collide with each other, which results in reducing the dynamic water pressure. The dynamic waves introduced into the spaces in the inside of the structure collide against the block coupling members and the sections having complex unevenness formed at the bottom part, whereby the pressure is reduced. During these processes, a great amount of air is swallowed in together with the waves, which proves helpful to increase the wave breaking action. Following the foregoing waves which were introduced into the internal spaces and subjected to the wave breaking actions, when the succeeding waves roll on to crash against the parallel members at the upper part of the structure, the foregoing waves flow down rapidly through the internal spaces. This causes an interfering phenomenon in the spaces within the structure between the rolling-on waves and the backwash, thus effecting the reduction of the wave force. Passage of the backwash through the inner spaces in the structure forces the structure to be pressed against the slanting plane and thereby resists the lifting forces produced by the dynamic water. Moreover, the fact that the present structure has larger spaces than those observed in block engagements or combinations of conventional techniques, permits the introduction of a sufficient amount of dynamic water into the spaces. Further, in case of non-uniform subsidence of the mound under the embankment thus formed, only those unit blocks which are on the dipped section sink in conformity with the subsidence. Therefore, the mound under the blocks is not destroyed. The present invention is also economically advantageous, since the structure of this invention requires less materials than are required in the conventional ones.

I claim:

1. A breakwater structure comprising a plurality of blocks arranged in zig-zag formation on the slope of an embankment to be revetted, each of said blocks comprising three parallel members and three coupling members connecting the parallel members, said blocks resting on the slope via two parallel members thereof, the third of said parallel members being spaced above the slope in aligned parallel relation relative to the slope, said two parallel members in contact with the slope having flat side surfaces such that adjacent blocks are in contact at these surfaces with each other, there being provided a space between said third parallel members of adjacent blocks and between the third parallel members and the other two parallel members of the blocks, all of these spaces being in communication with one another.

2. A structure according to claim 1 wherein said parallel members are hexagonal columnar bodies each having a flat section, the axial length of each coupling member being shorter than that of each columnar body.

3. A structure according to claim 1 wherein said third parallel member is a columnar body having a sector-shaped section, the other parallel members being columnar bodies having a quadrangular section, the coupling members connected to the parallel members being assembled in the center of the block, the axial length of the coupling members being less than that of each columnar body.

4. A structure according to claim 1 wherein said third parallel member is a columnar body having a sector-shaped section, the other parallel members being columnar bodies having a quadrangular section, each of the coupling members including a pair of spaced elements.

References Cited

UNITED STATES PATENTS

| | | | |
|---|---|---|---|
| 1,353,001 | 9/1920 | Uriarte | 61—4 |
| 2,159,685 | 5/1939 | Buzzell | 61—37 |
| 2,344,302 | 3/1944 | Harza | 61—37 |
| 2,755,631 | 7/1956 | Hayden | 61—4 |
| 2,909,037 | 10/1959 | Palmer | 61—4 |
| 3,252,287 | 5/1966 | Suzuki | 61—37 X |

FOREIGN PATENTS 730,189  5/1932  France.

EARL J. WITMER, *Primary Examiner.*